(12) United States Patent
Burke

(10) Patent No.: US 7,058,654 B1
(45) Date of Patent: ***Jun. 6, 2006

(54) USER INTERFACE AND SEARCH SYSTEM FOR INTERNET AND OTHER APPLICATIONS

(76) Inventor: Alexander James Burke, 3 Glenside Ter., Upper Montclair, NJ (US) 07043

( * ) Notice: Subject to any disclaimer, the term of this patent is extended or adjusted under 35 U.S.C. 154(b) by 0 days.

This patent is subject to a terminal disclaimer.

(21) Appl. No.: 10/641,647

(22) Filed: Aug. 15, 2003

Related U.S. Application Data

(62) Division of application No. 09/337,087, filed on Jun. 21, 1999, now Pat. No. 6,665,687.

(60) Provisional application No. 60/090,801, filed on Jun. 26, 1998.

(51) Int. Cl.
*G06F 17/30* (2006.01)

(52) U.S. Cl. .............................. 707/102; 707/7; 715/530

(58) Field of Classification Search .............. 707/1–10, 707/100–104.1, 200–205; 709/204; 345/716; 715/513, 530

See application file for complete search history.

(56) References Cited

U.S. PATENT DOCUMENTS

| | | | |
|---|---|---|---|
| 5,613,057 A | 3/1997 | Caravel ....................... | 395/806 |
| 5,742,816 A | 4/1998 | Barr et al. .................. | 395/616 |
| 5,787,254 A | 7/1998 | Maddalozzo, Jr. et al. ....................... | 395/200.58 |
| 5,799,151 A * | 8/1998 | Hoffer .......................... | 709/204 |
| 5,815,830 A | 9/1998 | Anthony ......................... | 707/6 |
| 5,854,630 A | 12/1998 | Nielsen ....................... | 345/352 |
| 5,855,020 A | 12/1998 | Kirsch .......................... | 707/10 |
| 5,890,172 A | 3/1999 | Borman et al. ............. | 707/501 |
| 5,911,145 A | 6/1999 | Arora et al. ................. | 707/514 |
| 5,930,801 A | 7/1999 | Falkenhainer et al. .. | 707/103 R |
| 6,005,565 A | 12/1999 | Legall et al. ................ | 345/716 |
| 6,072,483 A | 6/2000 | Rosin et al. ................. | 345/716 |
| 6,081,814 A | 6/2000 | Mangat et al. ............... | 707/501 |
| 6,111,611 A | 8/2000 | Ozkan et al. ............... | 348/465 |
| 6,195,692 B1 | 2/2001 | Hsu ............................ | 709/219 |
| 6,665,687 B1 * | 12/2003 | Burke ...................... | 707/104.1 |

* cited by examiner

*Primary Examiner*—Mohammad Ali

(57) ABSTRACT

A user interface provides historical and hierarchical search and navigation modes through previously selected and hierarchically linked multimedia applications, documents and directories. The system permits a search for information through hierarchically linked documents accessible via the Internet in which an individual document contains a reference link to a succeeding document. The systems includes an input processor for receiving a user entered search information item identifying an object associated with at least one of the hierarchically linked documents. An Internet processor for searching and identifying a plurality of child documents hierarchically linked to a parent document identified by the object and excluding non-hierarchically associated documents in response to user initiation of a hierarchical search. An output processor processes data identifying the plurality of child documents for communication to a reproduction device.

20 Claims, 9 Drawing Sheets

FIGURE 3

| INDEX 305 | URL 307 | INTERNET ADDR. 309 | FUNCTION E.G., CH, PRG NAME, FILE 312 | CATEGORY INFO. 314 | SUBCTGRY1 316 | SUBCTGRY2 319 | PWORD 323 | USERID 326 |
|---|---|---|---|---|---|---|---|---|
| 100 | WWW.A.COM | | INTERNET | WEB PG 1 | | | | |
| 101 | | A@B.COM | EMAIL | J. SMITH | | | | |
| 102 | | | SAT. VIDEO | NBC-4 | COMEDY | SEINFELD | | |
| 103 | | | CABLE | HBO | DRAMA | TITANIC | | |
| 104 | | | RADIO | CROCK | 102.9 | | | |
| 105 | | G@J.COM | INT. PHONE | H. JONES | | | | |
| 106 | | | PHONE | A. BROWN | | | | |
| 107 | WWW.B.COM | | INTERNET | HOTMAIL | | | | |
| 108 | | | WORD | FILENAME | | | | |
| 109 | | | HOMECTRL | ALARM | ROOM1 | | | |
| 110 | WWW.C.COM | | INTERNET | WEB PG 2 | | | | |
| 111 | | W@X.COM | EMAIL | ACME | | | | |
| 112 | WWW.D.COM | | INTERNET | WEB PG 3 | | | | |
| 113 | | | CABLE | ESPN | SPORT | FOOTBALL | | |
| 114 | | S@F.COM | INT. PHONE | D. GREEN | | | 2345 | |
| 115 | WWW.E.COM | | INTERNET | WEB PG 4 | | | CODE2 | BROWNA |
| 116 | WWW.F.COM | | INTERNET | WEB PG 5 | | | | |

FIGURE 4

| INDEX 305 | URL 307 | INTERNET ADDR. 309 | FUNCTION INFO. 312 | ACCES CONFIG INFO. 402 | POINTER 1 404 | | POINTER 2 410 | |
|---|---|---|---|---|---|---|---|---|
| | | | | | UPINDEX | DOWNINDEX 407 | BACKINDEX | FWDINDEX 414 |
| 100 | WWW.A.COM | | INTERNET | | 107 | | | 101 |
| 101 | | A@B.COM | EMAIL | | 108 | | 100 | 103 |
| 102 | | | SAT. VIDEO | | 116 | | | |
| 103 | | | CABLE | CODE3 | 119 | | 101 | 108 |
| 104 | | | RADIO | | 123 | | | |
| 105 | | G@J.COM | INT. PHONE | VOCALTEC | 111 | | | |
| 106 | | | PHONE | | | | | |
| 107 | WWW.B.COM | | INTERNET | | 110 | 100 | | 110 |
| 108 | | | WORD | WORD6.0 | 115 | 101 | 103 | |
| 109 | | | HOMECTRL | CODE2 | 117 | 107 | | |
| 110 | WWW.C.COM | | INTERNET | | 112 | 105 | 108 | |
| 111 | | W@X.COM | EMAIL | | | 110 | | |
| 112 | WWW.D.COM | | INTERNET | | 114 | 112 | | |
| 113 | | | CABLE | CODE1 | | | | |
| 114 | | S@F.COM | INT. PHONE | VOCALTEC | | 108 | | |
| 115 | WWW.E.COM | | INTERNET | | 120 | 102 | | |
| 116 | WWW.F.COM | | INTERNET | | | | | |

FIGURE 5

| | | |
|---|---|---|
| 520 — | BACK | |
| 517 — | FORWARD | |
| 515 — | STOP ACCESSING | |
| 513 — | HOME | |
| 509 — | WWW.C.COM | INTERNET 1 |
| 507 — | FILENAME | WORD6.0 2 |
| 505 — | HBO | CABLETV 3 |
| 502 — | A@B.COM | EMAIL 4 |
| 500 — | WWW.A.COM | INTERNET 5 |

FIGURE 6

| | | |
|---|---|---|
| 640 — | DOWN | |
| 637 — | UP | |
| 635 — | STOP ACCESSING | |
| 633 — | HOME | |
| 630 — | WWW.F.COM | INTERNET 1 |
| 627 — | NBC-4 | SAT. VIDEO 2 |
| 625 — | WWW.E.COM | INTERNET 1 |
| 623 — | FILENAME | WORD6.0 2 |
| 620 — | A@B.COM | EMAIL 3 |
| 615 — | G@J.COM | INT.-PHONE 1 |
| 613 — | WWW.D.COM | INTERNET 2 |
| 611 — | WWW.C.COM | INTERNET 3 |
| 609 — | WWW.B.COM | INTERNET 4 |
| 607 — | WWW.A.COM | INTERNET 5 |
| 602 — | W@X.COM | EMAIL 1 |
| 600 — | G@J.COM | INT.-PHONE 2 |

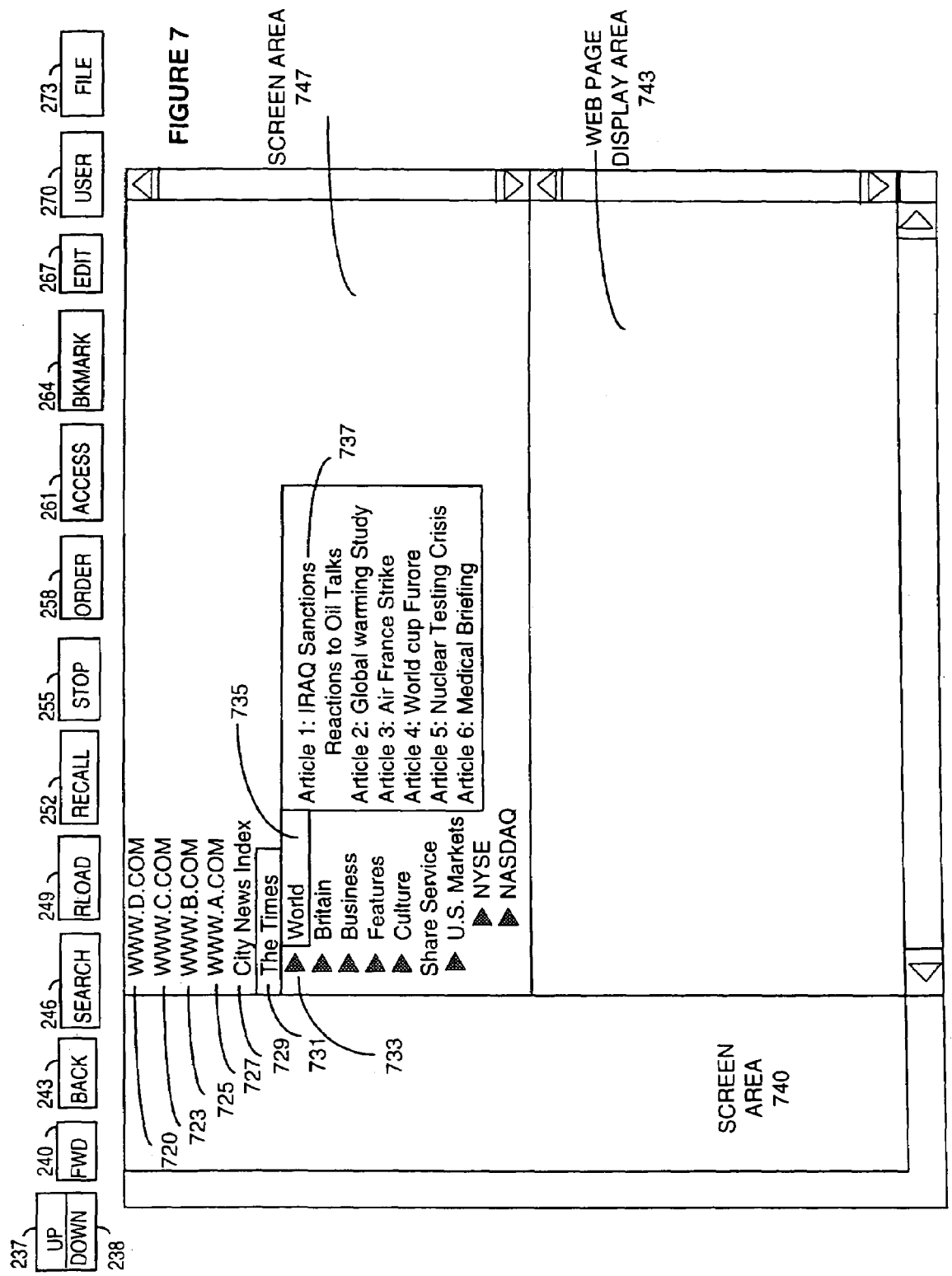

FIGURE 8

SEARCH ENTER:
CHANNEL, PROGRAM TITLE, PROGRAM TOPIC, PROGRAM THEME, TELEPHONE NO., FAX NO., EMAIL ADDRESS, NAME OF PERSON, CORPORATION ETC BOOKMARK URL, BOOKMARK SEARCH TERM (TEXT STRING), CONTROL FUNCTION, FILE NAME

FIGURE 9

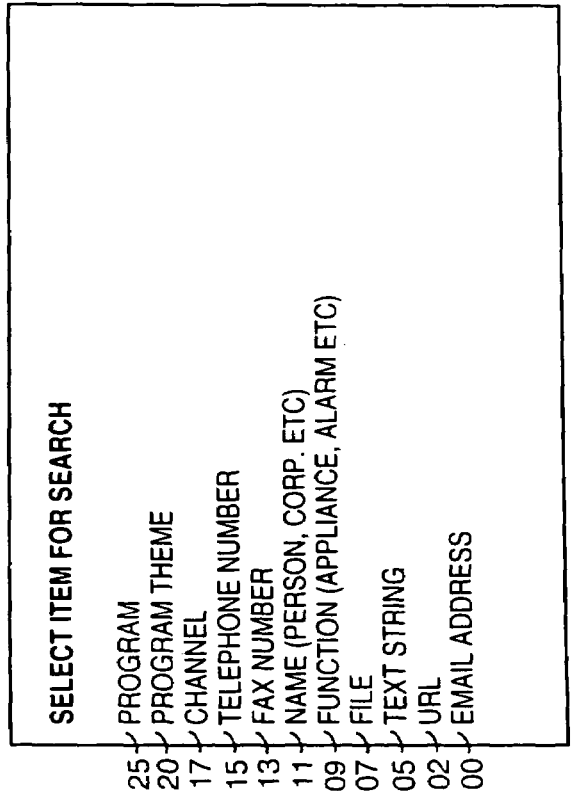

SELECT ITEM FOR SEARCH
- 925 — PROGRAM
- 920 — PROGRAM THEME
- 917 — CHANNEL
- 915 — TELEPHONE NUMBER
- 913 — FAX NUMBER
- 911 — NAME (PERSON, CORP. ETC)
- 909 — FUNCTION (APPLIANCE, ALARM ETC)
- 907 — FILE
- 905 — TEXT STRING
- 902 — URL
- 900 — EMAIL ADDRESS

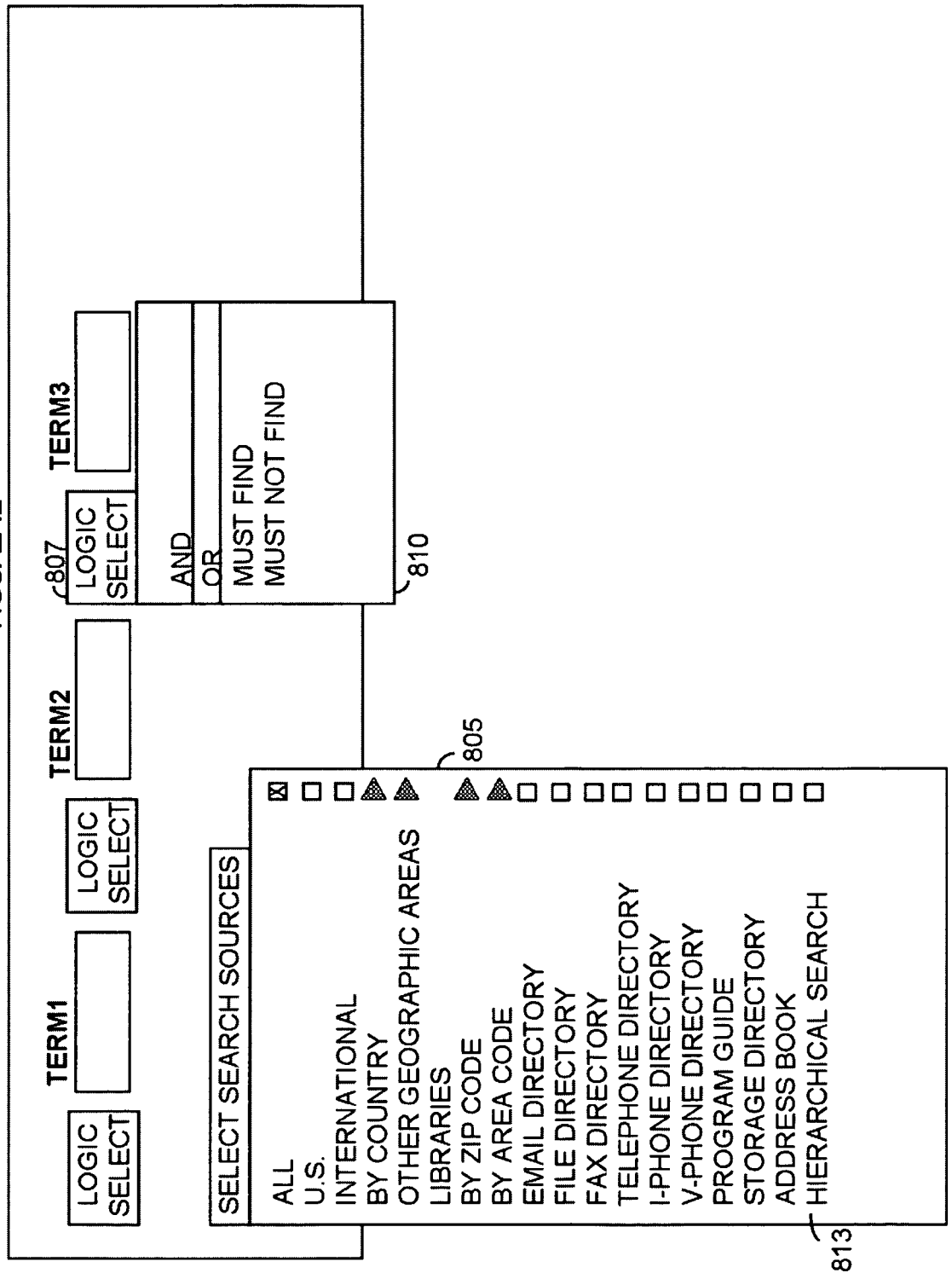

USER INTERFACE AND SEARCH SYSTEM FOR INTERNET AND OTHER APPLICATIONS

This is a divisional application of non-provisional application Ser. No. 09/337,087 now U.S. Pat. No. 6,665,687, by A. J. Burke, filed 21st Jun. 1999 claiming priority of provisional application Ser. No. 60/090,801 by A. J. Burke, filed 26th Jun. 1998.

FIELD OF THE INVENTION

This invention is related to the field of digital signal processing, and more particularly to an interface system supporting navigation, search and operation of multimedia functions.

BACKGROUND OF THE INVENTION

Processing devices such as personal computers (PCs), set-top box systems and combined personal computer and television systems (PC/TV systems), are increasingly becoming multimedia processing systems. Such systems are required to process and decode data from a variety of local and remote sources in different data formats for a variety of applications in response to User requests. For example, a multimedia decoder such as a PC/TV system may receive and transmit data via telephone (e.g. the Internet) and coaxial lines (e.g. cable TV) and from local sources such as Digital Video Disk (DVD), CDROM, VHS and Digital VHS (DVHS™) type players, PCs, and many other types of sources. A multimedia decoder may also receive data from satellite or terrestrial sources comprising High Definition Television (HDTV) broadcasts, Multi-point Microwave Distribution System (MMDS) broadcasts and Digital Video Broadcasts (DVB). A multimedia decoder may also be required to support a number of different functions such as Internet browsing, broadcast video decoding, fax, Email, telephone, home control, word processing and other computer functions.

A number of problems arise in providing a User interface for such a multimedia decoder system that supports complex User interactive tasks whilst providing a simple command interface suitable for the general public. Specifically, problems arise in navigating between different multimedia functions and in navigating within a specific multimedia system function. A problem also occurs in providing a user the capability to readily locate information items and functions in Internet browsing and other applications. These problems are addressed by a system according to the present invention.

SUMMARY OF THE INVENTION

The inventors have hereby recognized that a User interface providing multiple navigation and search modes and associated menus offers significant advantages. Specifically, a user interface providing historical and hierarchical navigation and search modes provides flexibility and usability in navigating and searching through previously selected and hierarchically linked multimedia applications documents and directories. Such a system also offers advantages in searching and navigation within a specific multimedia function. A system permits a search for information through hierarchically linked documents accessible via the Internet in which an individual document contains a reference link to a succeeding document. The system includes a display menu generator for initiating generation of data representing a menu item permitting user entry of a search information item identifying an object associated with at least one of the hierarchically linked documents. An Internet processor for identifying a plurality of child documents hierarchically linked to a parent document identified by the object and excluding non-hierarchically associated documents in response to user initiation of a hierarchical search. The display menu generator initiates generation of data representing an image window including data items identifying the plurality of child documents.

BRIEF DESCRIPTION OF THE DRAWINGS

In the drawing:

FIG. 3 shows a database for use in navigating and searching in a multimedia decoder system, according to the invention.

FIG. 4 shows the database of FIG. 3 incorporating additional elements and pointers for use in navigation and search operations, according to the invention.

FIG. 5 shows a menu enabling forward and backward navigation through different multimedia applications, according to the invention.

FIG. 6 shows a menu enabling upward and downward navigation through Internet and other multimedia applications, according to the invention.

FIG. 7 shows an exemplary split screen display format showing a hierarchical navigation menu and an application screen area associated with a selected navigation menu item, according to the invention.

FIG. 8 shows a menu enabling user entry of a search information item for searching across a plurality of multimedia applications, according to the invention.

FIG. 9 shows a menu for selecting a multimedia item category prior to entry of a specific search item, according to the invention.

FIGS. 11 and 12 show search menus for selection of displayed logical operators and search sources, according to the invention.

DETAILED DESCRIPTION OF THE DRAWINGS

Figure 1:
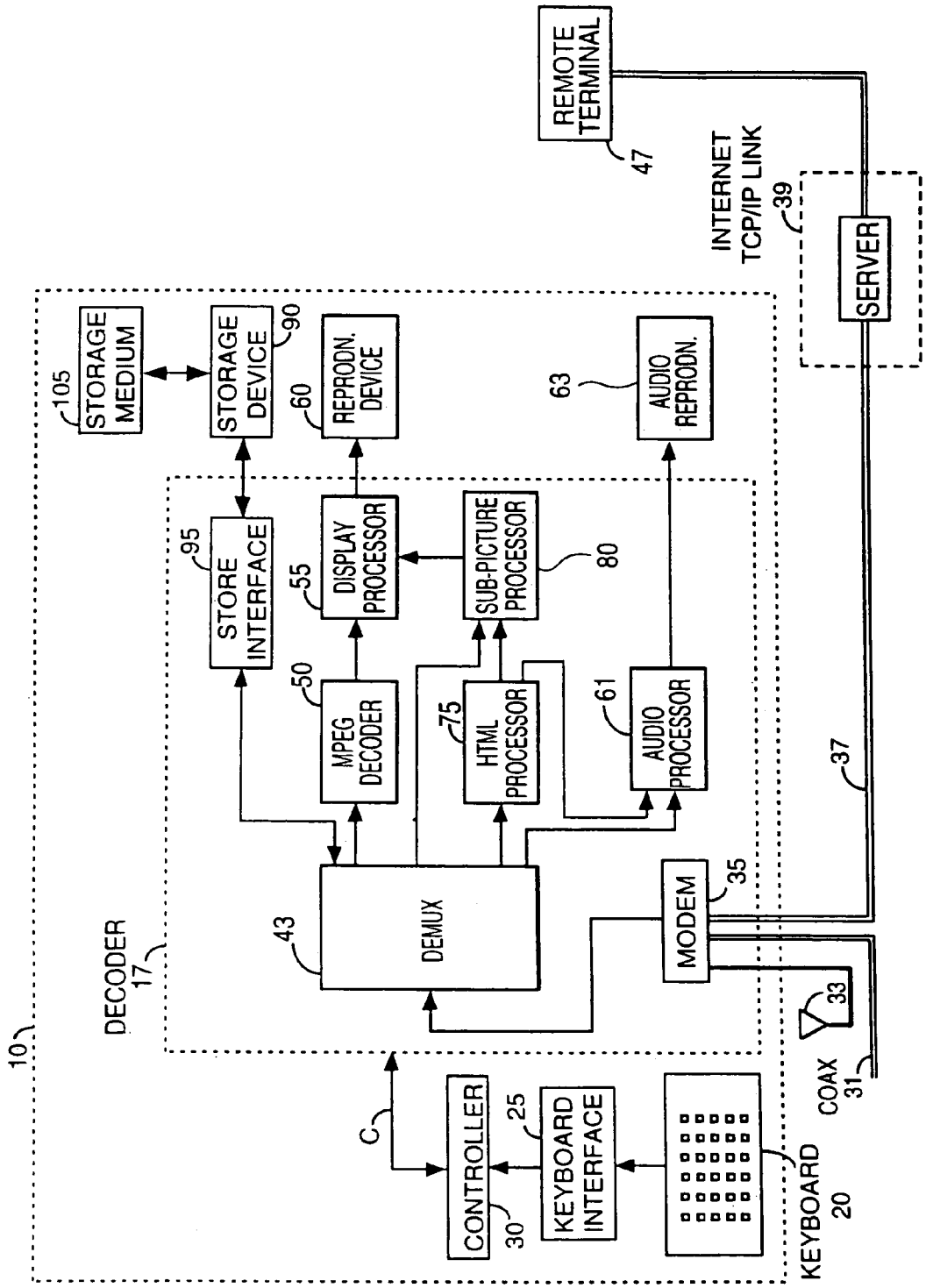
FIG. 1 shows a multimedia decoder incorporating a user interface according to the invention.

FIG. 1 shows a multimedia decoder communicating with multiple sources including cable, Internet and terrestrial broadcast sources and incorporating a user interface according to the invention. A User may initiate Email, telephone, Internet browsing, fax and video-phone functions via selection of options from displayed menus. The decoder system adaptively decodes Internet data representative of, for example, Hypertext Mark-up Language (HTML) or Standardized Mark-up Language (SGML) and broadcast data encoded to the MPEG standard incorporating compressed video and audio program data. The decoded data is formatted either as a composite video image or as separate video images for display.

The MPEG2 (Moving Pictures Expert Group) image encoding standard, hereinafter referred to as the "MPEG standard" is comprised of a system encoding section (ISO/IEC 13818-1, 10th Jun. 1994) and a video encoding section (ISO/IEC 13818-2, 20th Jan. 1995).

Although the disclosed system is described in the context of a system for receiving an Internet protocol compatible signal conveying HTML or SGML data and an MPEG compatible signal, it is exemplary only. The principles of the invention may be applied to systems in which the types of transmission channels and communication protocols may vary, or to systems in which the coding type may vary. Such systems may include non-MPEG compatible systems, for example, involving other types of encoded datastreams. Further, although the disclosed system is described as processing broadcast programs, this is exemplary only. The term 'program' is used to represent any form of data such as telephone messages, computer programs, Internet data or other communications, for example.

In overview, in the multimedia decoder system of FIG. 1, Internet protocol information representing a web page, for example, is received by multimedia decoder 17 of User terminal 10 from remote terminal 47 via Internet TCP/IP telephone line link 37 and server system 39. Decoder 17 also receives a carrier modulated with MPEG compatible video data from a terrestrial broadcast source via antenna 33. In addition, decoder 17 may also receive a cable TV carrier modulated with MPEG compatible video data from a cable source via coaxial line 31.

Decoder 17 demodulates and adaptively decompresses the input compressed MPEG video data and decodes the HTML Internet data to provide a composite video image or separate video images for display on unit 60. Decoder 17 also decodes MPEG coded audio data and provides decoded audio data to audio reproduction device 63. In other modes decoder 17 provides encoded data outputs for storage on storage medium 105 via storage device 90. Decoder 17 also communicates with other data sources (not shown to simplify drawing) via modem 35 and coaxial line 31 and telephone line 37 such as an Internet connection service (e.g. America On-line™).

A multimedia decoder user initiates functions including Email, telephone, Internet access, fax and video-phone functions and viewing and storage of selected programs via selection of options from a function display format. A User selects a displayed option with a cursor using keyboard and mouse unit 20. Commands from unit 20 are passed via interface 25 to controller 30. Unit 30 controls the operation of the elements of decoder 17 and responds to unit 20 commands using a bidirectional data and control signal bus C. Controller 30 controls the functions of individual elements within decoder 17 by setting control register values within these elements with control bus C. Controller 30 maintains a database incorporating a plurality of pointers advantageously supporting different modes of searching and menu navigation for a plurality of multimedia functions.

Considering FIG. 1 in detail, upon a user request for a web page, for example, decoder 17 establishes Internet access via telephone line 37 and retrieves the web page information in a conventional manner from the requested web page URL address (e.g. of remote terminal 47) via modem 35 and server 39. Controller 30 determines whether the requested Internet access is authorized from conditional access or smart card User entitlement information and if authorized, controller 30 establishes telephone communication with a service provider via server 39 by dialing a telephone number using modem 35 and transmitting the requested web page URL address code and user entitlement code, for example. Modem 35 may be a wide bandwidth communication modem such as a cable modem enabling decoder 17 to process both web page data and broadcast video program data for display from a cable source. Controller 30 uses response access data (including Transmission Control Protocol/Internet Protocol (TCP/IP) identification data) determined from an internal database to identify and assemble the web page TCP/IP packets containing the web page HTML (or SGML) and associated JAVA data (and other data e.g. JPEG, GIF, TIF type data) in the response datastream from server 39.

The response web page TCP/IP packets are buffered within modem 35 and provided to demultiplexer 43. Individual packets that comprise the requested web page information are identified by data identifiers (e.g. Packet Identifiers—PIDs) of the requested data. Controller 30, in conjunction with unit 43, identifies the input response web page data using a source identifier PID derived from the web page request address. Other messages may be identified from predetermined PIDs and PID mapping information stored within controller 30. Demultiplexer 43 in conjunction with controller 30 identifies and assembles the requested web page data using the PID information stored within controller 30. Unit 43 matches the PIDs of incoming packets in the datastream from modem 35 with PID values preloaded in control registers within unit 43 by controller 30. Therefore, HTML™ and Java™ encoded web page information representing a user requested web page image is assembled by unit 43 and provided to HTML™ processor 75 under command of controller 30.

Processor 75 decodes the HTML™ and Java™ encoded web page information and provides web page image representative pixel data to sub-picture processor 80 for storage in internal memory. Processor 75 incorporates the processing functions of a special web browser, including JPEG decompression and Java decoding such as involved in the operation of Netscape Navigator™, for example. Processor 75 provides audio data associated with the HTML™ and Java™ encoded web page information to audio processor 61. Audio processor 61 decodes the audio data from unit 75 and provides decoded and amplified audio data synchronized with the associated decoded web page video data to device 63 for audio reproduction.

Processor 80 formats the web page representative pixel data received from unit 75 (and sub-picture data from unit 50 in decoding MPEG compatible data) for storage as pixel mapped data in display processor 55. Processor 80 also creates a user interface comprising a set of interactive, hierarchical, navigation and search menu displays, according to the invention, for presentation on unit 60. The user interface system supports navigating and searching through a plurality of image displays by traversing through previously selected image displays in a first mode and by traversing through hierarchically linked image displays in a second mode. The menu displays include, for example, the displays shown in FIGS. 2, and 5–12, that enable searching and navigation through different multimedia applications, according to the invention. The search and navigation features shown in FIGS. 2 and 5–12 are achieved by controller 30 using a database created from both predetermined elements and from information elements from local and remote sources. The database is updated by controller 30 and employs a plurality of pointers as shown in FIGS. 3 and 4. The user interface menu displays are generated in the form of pixel map data by processor 80 under direction of controller 30. A menu database distinct from the search and navigation database is employed by controller 30 to support the creation and update of the user interface menu displays presented on unit 60. The menu database links particular menus and objects in search and navigation functions and links particular functions with selectable menu option icons in the menu currently displayed on unit 60. Controller 30 is thereby enabled to execute functions and navigate hierarchical menus displayed on unit 60 in response to User selection of a current menu option icon.

Controller 30 executes preprogrammed instructions constituting an operating system. In executing the instructions, controller 30 together with unit 80, generates a user interface comprising a hierarchical sequence of menus for continuous display on unit 60 for the duration of a User's interactive operation of decoder 17. The hierarchical menu displays are generated in the form of pixel map data by processor 80 under direction of controller 30. The hierarchical menu displays generated by processor 80 are provided to display processor 55 for formatting and storage in a pixel representative memory contained within unit 55.

Similar to the HTML web page data, MPEG encoded program data packets received within the response TCP/IP data from server 39 and buffered within modem 35 are provided to demultiplexer 43. Individual packets comprising a desired program are identified by data identifiers (PIDs) of the requested data. Controller 30, in conjunction with unit 43, identifies the packets of the desired program using PID values acquired from program specific information received in packetized program information accompanying the program content data. Demultiplexer 43 in conjunction with controller 30 identifies and assembles the MPEG program data by matching the PIDs of incoming packets in the datastream from modem 35 with PID values pre-loaded in control registers within unit 43 by controller 30. Therefore, MPEG encoded program representative video data is assembled by unit 43 and provided to MPEG decoder 50 under command of controller 30. Processor 50 decodes the MPEG encoded program data and provides decoded pixel representative image data to display processor 55 for formatting and storage in the pixel representative memory contained within unit 55. Also MPEG encoded audio data associated within the video data is assembled by unit 43 and provided to audio decoder 61 for processing and subsequent reproduction by unit 63 under command of controller 30.

Display processor 55 converts the stored and formatted video program data, and the hierarchical menu data provided from processor 80, into conventional luminance and chrominance components. The luminance and chrominance components, together with timing data provided by controller 30, are processed by processor 55 in a conventional manner to form an NTSC signal for display on NTSC compatible image reproduction device 60 e.g. a television or video monitor. Processor 55 may, in another embodiment, provide RGB output data for display by an RGB compatible reproduction device or a high definition television.

Figure 2:
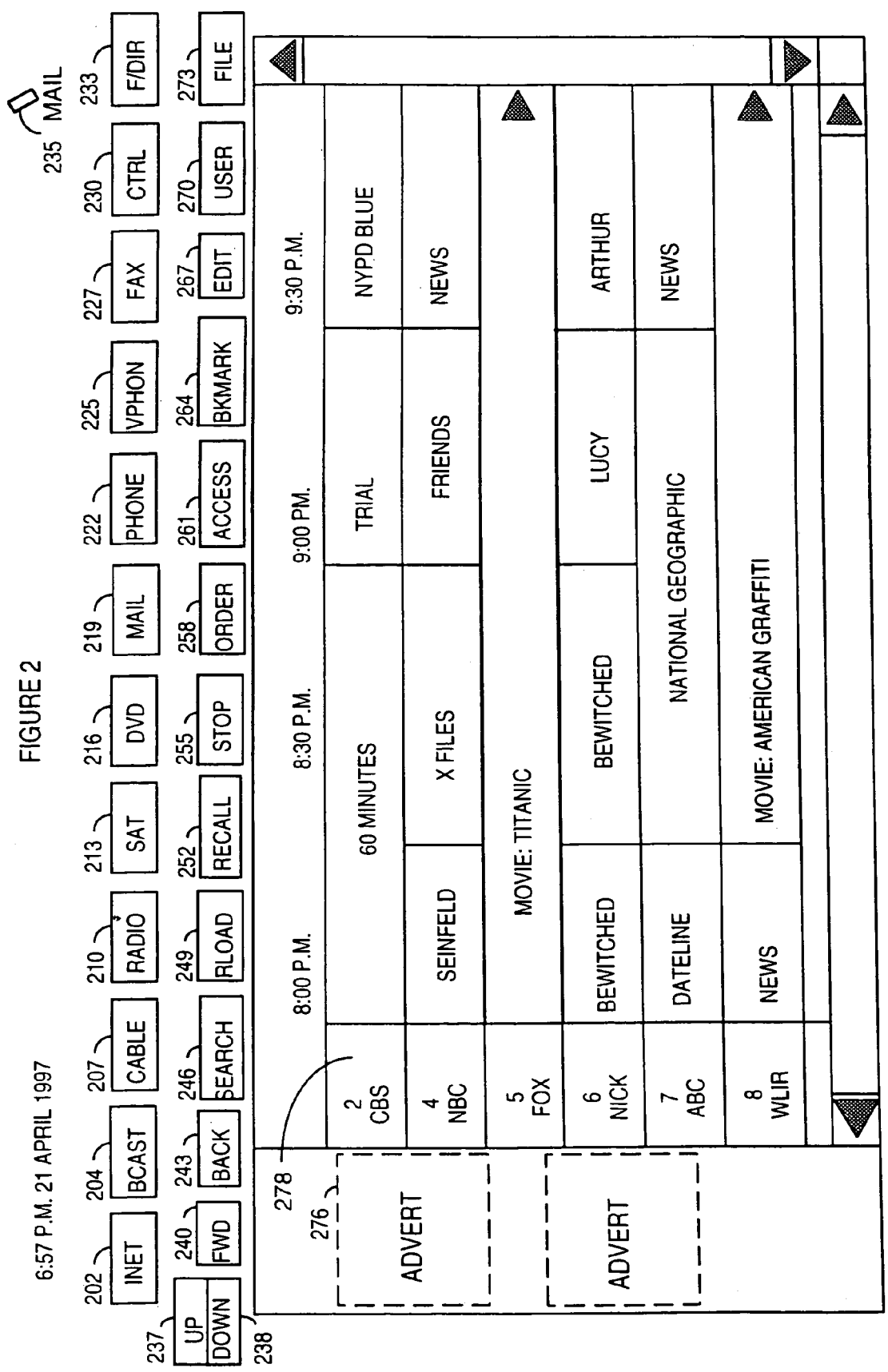
FIG. 2 shows an exemplary multimedia function display format according to the invention.

FIG. 2 shows a multimedia function display generated by controller 30 and processor 80 that supports user selection of a plurality of multimedia functions via user selectable icons 202–233. The multimedia function display also permits a plurality of ancillary search, navigation and other functions using icons 237–273.

The user interface system created by controller 30 and unit 80 supports navigating and searching through a plurality of image displays in a historical mode and in a hierarchical mode. In historical mode, upon selecting icons 240 and 243 a user may traverse through previously selected image displays. In a hierarchical mode, upon selecting icons 237 and 238 a user may traverse through hierarchically linked image displays such as a sequence of Internet documents or web pages in which each document contains a link or reference (e.g. an Internet URL) to a subsequent document in the sequence. The sequence of web page documents may not have been previously selected or viewed by a user of decoder 17. Further, the documents in the sequence may be advantageously acquired by controller 30 using the database and cached within memory of controller 30. This forward caching of hierarchically sequenced Internet documents is performed in the background and is transparent to a user. The forward caching of Internet documents facilitates fast hierarchical search and navigation.

FIG. 3 shows a portion of a database used by controller 30 for use in navigating and searching within decoder 17. The database structure of FIG. 3 contains an index value 305 for each record within the database. Index values range from 100 to 116 in exemplary database portion of FIG. 3. An index value is a base value enabling indexed addressing of individual records and their sub-elements to enable their identification and to permit them to be accessed. An index value may comprise a number, a code, an address such as a memory address or the index value may be one of the data base elements (305–326 of FIGS. 3 and 402–414 of FIG. 4) such as an Internet URL, for example. An index value 305 is associated with URL 307, Internet address (e.g. Email address) 309, function identifier 312, category information 314, sub-category1 information 316, sub-category2 information 319, password 323 and userid 326. Index values 305 are also associated with access configuration information 402, and upindex 404 and downindex 407 of pointer1, and backindex 410 and forwardindex 414 of pointer2, as shown in the additional database elements listed in FIG. 4.

For individual records in the database, pointers 1 and 2 (404, 407, 410 and 414) indicate index numbers 305 of subsequent records to be accessed in the various search and navigation modes. For example, in FIG. 4, assume the current application is a word data processing application as represented by index (column 305) value 108 containing a database record of the word application. Then, in historical navigation and search modes pointer2 backindex 410 indicates a backward navigation record index value of 103 indicating that upon historical backward navigation the next application is a cable television application (HBO) identified by index value 103. Similarly, in historical navigation and search mode, pointer2 forward index 414 indicates a forward navigation record index value of 110 indicating that upon historical forward navigation the next application is an Internet application (web page WWW.C.COM) identified by index value 110.

Further, in hierarchical navigation and search modes pointer1 upindex 404 indicates an upward navigation record index value of 115 indicating that upon hierarchical upward navigation the next application is an Internet application (web page WWW.E.COM) identified by index value 115. Similarly, in hierarchical navigation and search modes pointer1 downindex 407 indicates a downward navigation record index value of 101 indicating that upon hierarchical downward navigation the next application is an Email application (A@B.COM) identified by index value 101. Thereby pointers 1 and 2 support search and navigation through the decoder 17 multimedia functions.

FIG. 5 shows a menu enabling forward and backward navigation through different multimedia applications, according to the invention. Menu entries 500–509 correspond to the navigation path shown in FIG. 4 identified by backindex 410 and forwardindex 414 of pointer2. FIG. 5 shows that the current application is HBO (entry 505). By selecting an entry in this menu such as entry 500, or 502 a user may navigate backward and by selecting entry 507 or 509 a user may navigate forward. Alternatively, a user may select back icon 520 to scroll through the back navigation menu items and the entry finally attained is opened automatically by decoder 17. Similarly, a user may scroll through forward navigation menu items using icon 517. Menu items 513 and 515 are used to return to a "home" application and to stop loading of a selected application respectively.

The historical navigation through the application items 500–509 is achieved by controller 30 using the database pointer2 shown in FIG. 4. In addition, a user may navigate directly both forward and back through applications using icons 240 and 243 as shown in FIG. 1. Alternatively icons 240 and 243 may be used to activate an intervening menu such as the menu of FIG. 5 to permit forward and backward navigation through previously selected multimedia applications.

FIG. 6 shows a menu enabling upward and downward navigation through hierarchically linked Internet and other multimedia applications and documents, according to the invention. These applications/documents may be linked by URL reference links or other links such as by other types of embedded references such as a simple text reference to another document, a telephone number, fax number, word document filename or the other database elements associated with the base index value listed in FIGS. 3 and 4 etc. These applications may also be linked by a user entered hierarchical reference system using a menu (not shown to preserve drawing clarity). Menu entries 600–630 correspond to the navigation paths shown in FIG. 4 identified by upindex 404 and downindex 407 of pointer1. Four sets of navigation paths are shown comprising path1 600–602, path2 607–615, path3 620–625 and path4 627–630. FIG. 6 shows that the current application is an Internet telephone application (entry 615 of path2). By selecting an entry in this menu such as entry 607, or 611 a user may navigate downward through a set of hierarchically linked applications/documents (e.g. Internet web pages). A user may also navigate upward through a set of hierarchically linked applications/documents e.g. if the current application was 611, then by selecting entry 613 upward navigation through the applications occurs. A user may also move to another navigation path by simply selecting a different path menu entry e.g. by selecting entry 623 a user moves from hierarchical path2 to hierarchical path3. Alternatively, a user may select down icon 640 to scroll through the down navigation menu items and the entry finally attained is opened automatically by decoder 17. Similarly, a user may scroll through upward navigation menu items using icon 637. Menu items 633 and 635 are used to return to a "home" application and to stop loading of a selected application respectively.

The hierarchical navigation through the application items 600–630 is achieved by controller 30 using the database pointer1 shown in FIG. 4. In addition, a user may navigate directly both upward and downward through applications using icons 237 and 238 as shown in FIG. 1. Alternatively icons 237 and 238 may be used to activate an intervening menu such as the menu of FIG. 6 to permit upward and downward navigation through hierarchically linked multimedia applications.

FIG. 7 shows an exemplary split screen display format showing a hierarchical navigation menu in screen area 747 and an application screen area 743 associated with a selected navigation menu item, according to the invention. The hierarchical application navigation path shows parallel linkage, for example, the world document 735 referenced by the times 731 and identified as a sub-reference by indicator 733 contains 6 references to 6 articles 1–6 shown in area 737. Menu items 720–729 show documents from independent sources. Items 720–727 correspond to a portion of the hierarchical navigation path2 (items 607–613 of FIG. 6). A user may navigate through the hierarchical navigation path by selecting entries in screen area 747 and by scrolling the navigation screen area 747 using the arrow icons in the area 747 frame. The format of FIG. 7 may also be used for historical navigation display and may be displayed upon selection of hierarchical navigation items 237 and 238 and historical navigation items 240 and 243 in FIG. 1. The hierarchical and historical navigation through the application items of area 747 is achieved by controller 30 using the database pointer1 and pointer2 shown in FIG. 4 as described in connection with FIGS. 3–6.

FIG. 8 shows a menu enabling user entry of a search information item for searching across a plurality of multimedia applications, according to the invention. A user may search for objects both in the database of controller 30 and in the applications and associated documents identified by the database of controller 30. Through the menu of FIG. 8, a user may search for a channel, program title, program topic e.g. movies, a program theme e.g. comedy, a telephone or fax number, Email address, name of a person or corporation or other entity, an Internet URL, a text string, a control function e.g. set burglar alarm, or a filename, for example.

FIG. 9 shows a menu for selecting a multimedia item category prior to entry of a specific search item, according to the invention. Upon selection of a category such as categories 900–925 of FIG. 9 a search dialog box is presented to a user. Exemplary dialog boxes for searching are shown in FIGS. 8 and 10–12.

Figure 10:
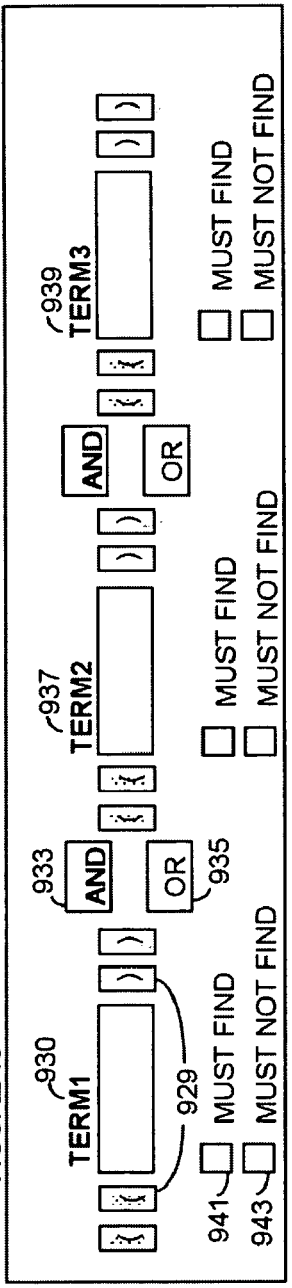
FIG. 10 shows a search menu permitting user selection of a logical operator linking search terms in which the logical operator is selected from a plurality of displayed logical operators, according to the invention.

FIG. 10 shows a search menu permitting user selection of a logical operator linking search terms 930, 937 and 939 in which the logical operator is selected from a plurality of displayed logical operators (929, 933 or 935, for example), according to the invention. In addition, the menu also permits the search definition to specify mandatory inclusion or exclusion of search terms with user selectable option boxes 941 and 943. This search menu enables a user to craft a logical search in an easy to use graphical manner without resorting to a hidden, and platform variable syntax of search logic. The displayed logical operators (929, 933 or 935) are exemplary only and additional ones may be included corresponding to known algebraic or other operations such as an exclusive-or operator etc.

Figure 11:
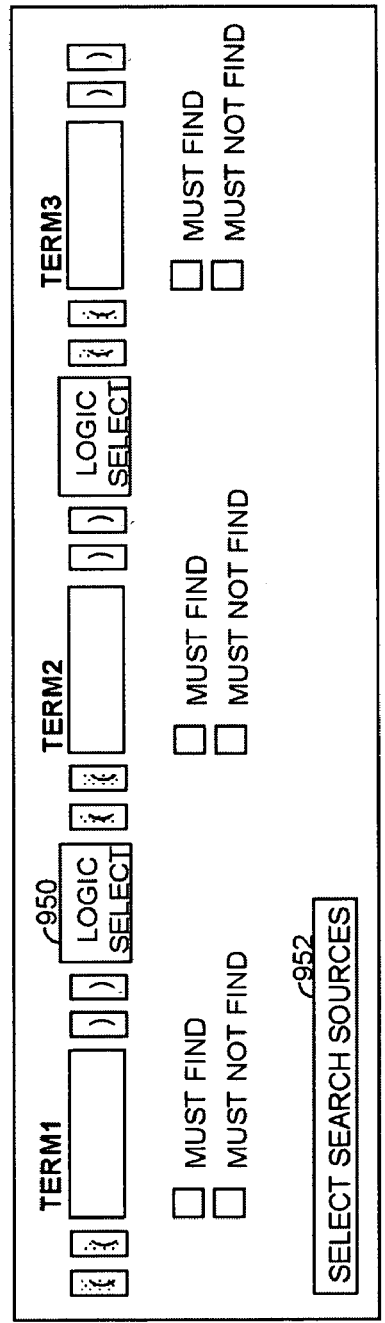

FIGS. 11 and 12 show search menus for selection of displayed logical operators and search sources, according to the invention. FIG. 11 shows logical operator selection using a menu item 950 for selection of a logical operator and also an item 952 permitting selection of sources to be searched.

FIG. 12 shows logical search operators being presented in a menu format 810 following user selection of item 807 by mouse-cursor arrangement, for example. FIG. 12 also shows a menu 805 permitting user selection of a source to be searched. In the absence of a user source selection, a default selection of all sources is made. The sources that may be individually selected include a hierarchical document search 813 in which case an existing open document is taken as the base document for the search. A hierarchical document search is then performed using the method described in connection with FIGS. 3–6. If no base document is open, the menu issues a prompt for selection of such a document which may comprise any of the applications/documents listed within the controller 30 database. Alternatively, documents stored remotely may be searched such as an Internet web page, for example, using a conventional web browser system such as provided by Netscape Navigator™. Item 805 also enables selection of a library and one or more directories for search such as an Email, file, telephone, Internet phone, fax, video-phone, address book or storage directory. The search sources may also be defined geographically by country or other area. Further, searching by zip code and area code is also supported and upon such a selection an additional dialog box is presented to a user to prompt user entry of one or more zip or area codes.

In other modes, decoder 17 is adaptively configured by controller 30 to receive satellite or terrestrial broadcast data via antenna 33 or cable television broadcast data via coaxial line 31. In terrestrial broadcast mode, for example, modem 35 is configured to receive a carrier modulated with video data from antenna 33. An input processor within modem 35 converts the video data to digital form. The unit 35 input processor also includes radio frequency (RF) tuner and intermediate frequency (IF) mixer and amplification stages for down-converting the input video signal to a lower frequency band. The unit 35 input processor also includes an analog to digital converter for digitizing the down-converted signal to produce a signal suitable for further processing. The resultant digital output signal is demodulated and decoded and error-corrected by other elements in unit 35 and provided to demultiplexer 43 for further processing as previously described. Unit 35 adopts a similar process for input processing and decoding cable television broadcast data received via coaxial line 31 following configuration by controller 30.

The architecture of FIG. 1 is not exclusive. Other architectures may be derived in accordance with the principles of the invention to accomplish the same objectives. Further, the functions of the elements of terminal 10 of FIG. 1 and the process steps employed in creating, operating and updating the search and navigation database and in implementing the search and navigation functions may be performed in whole or in part within the programmed instructions of a microprocessor.

What is claimed is:

1. A system permitting a search for information through hierarchically linked documents accessible via the Internet in which an individual document contains a reference link to a succeeding document, comprising:
   an input processor for receiving a user entered search information item identifying an object associated with at least one of said hierarchically linked documents;
   an Internet processor for searching and identifying a plurality of grandchild documents hierarchically and linearly linked to a corresponding plurality of child documents, said child documents being hierarchically and linearly linked to a parent document identified by said object and excluding non-hierarchically and non-linearly associated documents in response to user initiation of a hierarchical search; and
   an output processor for processing data identifying said plurality of child documents for communication to a reproduction device.

2. A system according to claim 1, wherein
said object comprises at least one of a) an Internet URL, and b) an Internet address representative code.

3. A system according to claim 1, wherein
said Internet processor searches to find an object comprising at least one of, a) an entity name, b) a program identifier, c) a telephone/fax number, d) a program broadcast channel, e) an application file, f) a text string and g) similar subject matter text determined from a text or search subject mapping database.

4. A system according to claim 1, wherein
said parent document, child document and grandchild document are multimedia documents associated with applications comprising at least two of, a) Internet web page browsing, b) Email, c) Internet telephony, d) telephony, e) fax, f) broadcast video, g) videophone, h) broadcast radio, i) broadcast audio, j) home control, and i) a word processing or spreadsheet application.

5. A system according to claim 1, including
a display menu generator producing a display menu enabling a user to select an information item to be searched, said selected information item comprising at least one of, a) an Internet URL, b) a telephone/fax number, c) a video broadcast channel, d) an application file, and e) an Email address.

6. A system according to claim 1, wherein
said Internet processor identifies a plurality of child documents by employing a first user entered search information item and a second user entered search information item and a user selected search function comprising at least one of, a) a MUST FIND function and b) a MUST NOT ED function, for use with a search information item.

7. A method for searching for information through hierarchically linked documents accessible via the Internet in which an individual document contains a reference link to a succeeding document, comprising the activities of:
   initiating generation of data representing a menu item permitting user entry of a search information item identifying an object associated with at least one of said hierarchically linked documents;
   using reference links in individual documents to identify search results comprising a sequence of documents including a grandchild document hierarchically and linearly linked to a child document, said child document being hierarchically and linearly linked to a parent document identified by said object in response to user initiation of a hierarchical search;
   excluding non-hierarchically and non-linearly associated documents from said search results; and
   processing data representing said search results to be suitable for communication to a reproduction device.

8. A system according to claim 7, wherein
said step of identifying search results includes the step of employing a first user entered search information item and a second user entered search information item and a user selected search function comprising at least one of, a) a MUST FIND function and b) a MUST NOT FIND function, for use with a search information item.

9. A system permitting a search through a sequence of hierarchically linked documents accessible via the Internet in which an individual document contains a reference link to a succeeding document, comprising:
   an interface processor for receiving user entered search information items; and
   an Internet processor for, in response to user initiation of a hierarchical search,
      identifying a sequence of documents including a grandchild document hierarchically linked to a child document, said child document being hierarchically linked to a parent document, using reference links in individual documents to identify succeeding documents in said sequence,
      searching through said sequence of hierarchically linked documents to identify result documents containing a user entered first search information item, excluding non-hierarchically associated documents, from said identified result documents, excluding documents omitting a second user entered search information item, from said identified result documents and providing data items identifying said result documents.

10. A system according to claim 9, wherein said Internet processor excludes documents containing a third user entered search information item, from said identified result documents.

11. A system according to claim 9, wherein said Internet processor searches through said sequence of hierarchically linked documents to identify result documents containing a user entered Boolean search term including at least one of, (a) an AND operator and (b) an OR operator.

12. A system according to claim 10, wherein said Internet processor searches through said sequence of hierarchically linked documents to identify result documents containing a user entered Boolean search term including at least one of, (a) an AND operator and (b) an OR operator.

13. A system according to claim 9, wherein said Internet processor searches through said sequence of hierarchically linked documents to identify result documents restricted to HTML or SGML type documents, in response to a user entered search command.

14. A system according to claim 13, wherein said Internet processor searches through said sequence of hierarchically linked documents to identify result documents restricted to documents from a particular country, in response to a user entered search command.

15. A system according to claim 14, wherein said Internet processor searches through said sequence of hierarchically linked documents to identify result documents restricted to documents representing video, in response to a user entered search command.

16. A system according to claim 14, wherein said Internet processor searches through said sequence of hierarchically linked documents to identify result documents restricted to documents from at least one of, a) an area associated with an area code, b) an area associated with a zip code and (c) a geographic area, in response to a user entered search command.

17. A system according to claim 10, wherein said Internet processor searches through said sequence of hierarchically linked documents to identify result documents restricted to documents from a particular country, in response to a user entered search command.

18. A system according to claim 17, wherein said Internet processor searches through said sequence of hierarchically linked documents to identify result documents containing a user entered Boolean search term including at least one of, (a) an AND operator and (b) an OR operator.

19. A system according to claim 18, wherein a search information item comprises at least one of a) an Internet URL, and b) an Internet address representative code.

20. A system according to claim 9, wherein said Internet processor searches through said sequence of hierarchically linked documents to identify result documents restricted to documents from a particular directory including one or more of a) a telephone number directory, b) a fax number directory, c) an Email directory, d) a videophone/Internet-phone directory, e) an Internet URL directory, and f) a directory of currently available on-line Tnternet users.

* * * * *

UNITED STATES PATENT AND TRADEMARK OFFICE
CERTIFICATE OF CORRECTION

| | | |
|---|---|---|
| PATENT NO. | : 7,058,654 B1 | Page 1 of 1 |
| APPLICATION NO. | : 10/641647 | |
| DATED | : June 6, 2006 | |
| INVENTOR(S) | : Alexander James Burke | |

It is certified that error appears in the above-identified patent and that said Letters Patent is hereby corrected as shown below:

In the Claims

Column 10 line 22 delete "ED" replace with --FIND--.

Column 12 line 33 delete "Tnternet" replace with --Internet--.

Signed and Sealed this
Twenty-fourth Day of March, 2015

Michelle K. Lee
*Director of the United States Patent and Trademark Office*